(12) United States Patent
Hu et al.

(10) Patent No.: US 12,072,565 B2
(45) Date of Patent: Aug. 27, 2024

(54) TEMPERATURE CONTROL SYSTEM AND DRIVING METHOD THEREOF, AND LIQUID CRYSTAL APPARATUS

(71) Applicants: Beijing BOE Sensor Technology Co., Ltd., Beijing (CN); BOE Technology Group Co., Ltd., Beijing (CN)

(72) Inventors: Dahai Hu, Beijing (CN); Wei Sun, Beijing (CN); Chen Meng, Beijing (CN); Bo Fu, Beijing (CN); Shaobo Han, Beijing (CN); Zhong Hu, Beijing (CN); Guo Liu, Beijing (CN); Jiarong Liu, Beijing (CN); Xiantao Liu, Beijing (CN); Yutao Tang, Beijing (CN); Qinhao Piao, Beijing (CN); Yongbo Wang, Beijing (CN); Siheng Xu, Beijing (CN); Wenjie Zhong, Beijing (CN); Binghai Zhu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 387 days.

(21) Appl. No.: 17/606,745

(22) PCT Filed: Dec. 25, 2020

(86) PCT No.: PCT/CN2020/139374
§ 371 (c)(1),
(2) Date: Oct. 26, 2021

(87) PCT Pub. No.: WO2022/133999
PCT Pub. Date: Jun. 30, 2022

(65) Prior Publication Data
US 2022/0397789 A1     Dec. 15, 2022

(51) Int. Cl.
*G02F 1/1333* (2006.01)
*G01K 7/02* (2021.01)
(Continued)

(52) U.S. Cl.
CPC ......... *G02F 1/133385* (2013.01); *G01K 7/02* (2013.01); *G05D 23/22* (2013.01);
(Continued)

(58) Field of Classification Search
None
See application file for complete search history.

(56) References Cited

U.S. PATENT DOCUMENTS

| 6,535,266 | B1 | 3/2003 | Nemeth et al. | |
| 2004/0085155 | A1* | 5/2004 | Hofmeister | H03F 3/08 333/167 |

(Continued)

FOREIGN PATENT DOCUMENTS

| CN | 201434433 Y | 3/2010 |
| CN | 201569825 U | 9/2010 |

(Continued)

*Primary Examiner* — Richard H Kim
(74) *Attorney, Agent, or Firm* — IPro, PLLC

(57) ABSTRACT

A temperature control system and a driving method thereof, and a liquid crystal apparatus are provided. In the temperature control system, an input voltage adjustment circuit is respectively coupled to a control signal output end of a control circuit, a power signal output end, and an input end of a signal amplification circuit, and is configured to control the signal strength of a basic electrical signal transmitted to the input end of the signal amplification circuit under the control of a control signal output from the control signal output end; the signal amplification circuit is configured to output a corresponding target electrical signal to a heating element according to the basic electrical signal, and the heating element is configured to adjust the heating temperature according to the target electrical signal; a temperature (Continued)

sensing circuit is respectively coupled to the heating element and the control circuit, and is configured to convert a sensed sensing signal into a feedback signal and transmit the feedback signal to the control circuit; and the control circuit is configured to control the control signal output from the control signal output end according to the received feedback signal.

14 Claims, 5 Drawing Sheets

(51) Int. Cl.
 *G02F 1/1339* (2006.01)
 *G05D 23/22* (2006.01)
 *H05B 1/02* (2006.01)
(52) U.S. Cl.
 CPC ....... *H05B 1/023* (2013.01); *G02F 1/133302* (2021.01); *G02F 1/1339* (2013.01); *G02F 2202/04* (2013.01); *G02F 2202/16* (2013.01); *G02F 2202/28* (2013.01)

(56) References Cited

U.S. PATENT DOCUMENTS

2011/0147359 A1* 6/2011 Xiong ..................... G06F 11/24
 374/45
2016/0374573 A1* 12/2016 Kashi ................. H03F 3/45475
 600/479

FOREIGN PATENT DOCUMENTS

| CN | 204440200 U | 7/2015 |
| CN | 105929582 A | 9/2016 |
| CN | 111580582 A | 8/2020 |

* cited by examiner

TEMPERATURE CONTROL SYSTEM AND
DRIVING METHOD THEREOF, AND LIQUID
CRYSTAL APPARATUS

CROSS-REFERENCE TO RELATED APPLICATIONS

This application is the U.S. national phase of PCT Application PCT/CN2020/139374 filed on Dec. 25, 2020, the entire contents of which are incorporated herein by reference.

TECHNICAL FIELD

The present disclosure relates to the technical field of rail transit, and more particularly to a temperature control system and a driving method thereof, and a liquid crystal apparatus.

BACKGROUND

At present, some ordinary traffic windows are gradually replaced with smart windows which are composed of glass and dye liquid crystal molecules. By adjusting the deflection angle of the dye liquid crystal molecules, the transmittance of the smart window can be controlled. A passenger can control the transmittance of a smart window according to actual requirements when riding in a vehicle with the smart window, so as to better enhance the riding experience.

SUMMARY

An objective of the present disclosure is to provide a temperature control system and a driving method thereof, and a liquid crystal apparatus.

In order to achieve the above objective, the present disclosure provides the following technical solutions:

a first aspect of the present disclosure provides a temperature control system including: a control circuit, an input voltage adjustment circuit, a signal amplification circuit, a temperature sensing circuit, and a heating element;

wherein the input voltage adjustment circuit is respectively coupled to a control signal output end of the control circuit, a power signal output end, and an input end of the signal amplification circuit, and is configured to: control the signal strength of a basic electric signal transmitted to the input end of the signal amplification circuit under the control of a control signal output from the control signal output end;

an output end of the signal amplification circuit is coupled to the heating element, and is configured to output a corresponding target electrical signal to the heating element according to the basic electrical signal, and the heating element is configured to adjust the heating temperature according to the target electrical signal; and the temperature sensing circuit is respectively coupled to the heating element and the control circuit, and is configured to convert a sensed sensing signal into a feedback signal and transmit the feedback signal to the control circuit, and the control circuit is configured to control the control signal output from the control signal output end according to the received feedback signal.

Optionally, the temperature control system further includes a power supply circuit including the power signal output end and further including:

a voltage division circuit, a first end of the voltage division circuit being coupled to the power signal output end; and a filtering circuit, a first end of the filtering circuit being coupled to a second end of the voltage division circuit, and a second end of the filtering circuit being coupled to a first level signal input end.

Optionally, the input voltage adjustment circuit includes a digital potentiometer respectively coupled to the control signal output end of the control circuit, the power signal output end, and the input end of the signal amplification circuit, and configured to change a resistance value under the control of the control signal output from the control signal output end to control the signal strength of the basic electrical signal transmitted to the input end of the signal amplification circuit.

Optionally, the signal amplification circuit includes:

a first operational amplifier, wherein an inverting input end of the first operational amplifier is respectively coupled to an output end of the operational amplifier and the input voltage adjustment circuit, and is configured to receive the basic electric signal; a non-inverting input end of the first operational amplifier is coupled to the first level signal input end; and the output end of the first operational amplifier is coupled to the heating element.

Optionally, the signal amplification circuit includes:

a second operational amplifier, wherein an inverting input end of the second operational amplifier is coupled to an output end of the operational amplifier, a non-inverting input end of the second operational amplifier is coupled to the input voltage adjustment circuit, and is configured to receive the basic electric signal; and the output end of the second operational amplifier is coupled to the heating element.

Optionally, the temperature sensing circuit includes a thermocouple sensor, wherein a working end of the thermocouple sensor is coupled to the heating element, a feedback end of the thermocouple sensor is coupled to the control circuit, and a reference end of the thermocouple sensor is configured to receive the outside temperature.

Optionally, the heating element includes a resistance wire.

Based on the technical solutions of the above temperature control system, a second aspect of the present disclosure provides a liquid crystal apparatus including the above temperature control system and further including a liquid crystal panel, wherein the temperature control system is arranged in an opaque region of the liquid crystal panel, and the temperature control system can control the temperature of the liquid crystal panel by controlling the heating temperature of the heating element.

Optionally, the liquid crystal panel includes a first substrate and a second substrate which are arranged opposite to each other, and dye liquid crystal molecules arranged between the first substrate and the second substrate, the first substrate and the second substrate are bonded together by a frame sealing adhesive in an encapsulation region of the liquid crystal panel; and the temperature control system is arranged in the encapsulation region.

Optionally, the heating elements in the temperature control system are respectively located on two opposite sides of the liquid crystal panel.

Optionally, a plurality of heat dissipation holes are formed in the encapsulation region of the liquid crystal panel.

Optionally, the plurality of heat dissipation holes are located at a bottom of the liquid crystal apparatus.

Optionally, the liquid crystal apparatus further includes a heat conduction member coupled to the plurality of heat dissipation holes and configured to conduct heat discharged from the plurality of heat dissipation holes to an external heating apparatus.

Optionally, the liquid crystal apparatus includes liquid crystal glass.

Based on the technical solutions of the above temperature control system, a third aspect of the present disclosure provides a driving method of a temperature control system including: a control circuit, an input voltage adjustment circuit, a signal amplification circuit, a temperature sensing circuit, and a heating element; wherein the input voltage adjustment circuit is respectively coupled to a control signal output end of the control circuit, a power signal output end, and an input end of the signal amplification circuit; an output end of the signal amplification circuit is coupled to the heating element; the temperature sensing circuit is respectively coupled to the heating element and the control circuit; and the driving method includes the following steps:

- outputting, by the power signal output end, a power signal;
- controlling, by the input voltage adjustment circuit, the signal strength of a basic electrical signal transmitted to the input end of the signal amplification circuit under the control of a control signal output from the control signal output end;
- outputting, by the signal amplification circuit, a corresponding target electrical signal to the heating element according to the basic electrical signal;
- adjusting, by the heating element, the heating temperature according to the target electric signal;
- converting, by the temperature sensing circuit, a sensed sensing signal into a feedback signal, and transmitting the feedback signal to the control circuit; and
- controlling, by the control circuit, the control signal output from the control signal output end according to the received feedback signal.

BRIEF DESCRIPTION OF THE DRAWINGS

The accompanying drawings described here are used to provide a further understanding of the present disclosure and constitute a part of the present disclosure, and illustrate embodiments of the present disclosure and together with the description serve to explain the present disclosure and do not constitute an undue limitation. In the drawings.

DETAILED DESCRIPTION

In order to further explain a temperature control system and a driving method thereof, and a liquid crystal apparatus provided by embodiments of the present disclosure, a detailed description will be given below with reference to the accompanying drawings.

When in use, a smart window is prone to display abnormalities in a low-temperature (generally, the temperature is lower than −25° C.) environment. Especially, when there are many white Mura defects on the smart window, which cause the smart window to fail to work normally.

Through analysis and experiment, it is found that the reason for this situation is that in the low-temperature environment, the viscosity of liquid crystal molecules inside glass increases, so that some liquid crystal molecules cannot be inverted according to an original plan.

Based on the above findings, the embodiments of the present disclosure provide the following technical solutions.

Figure 1:
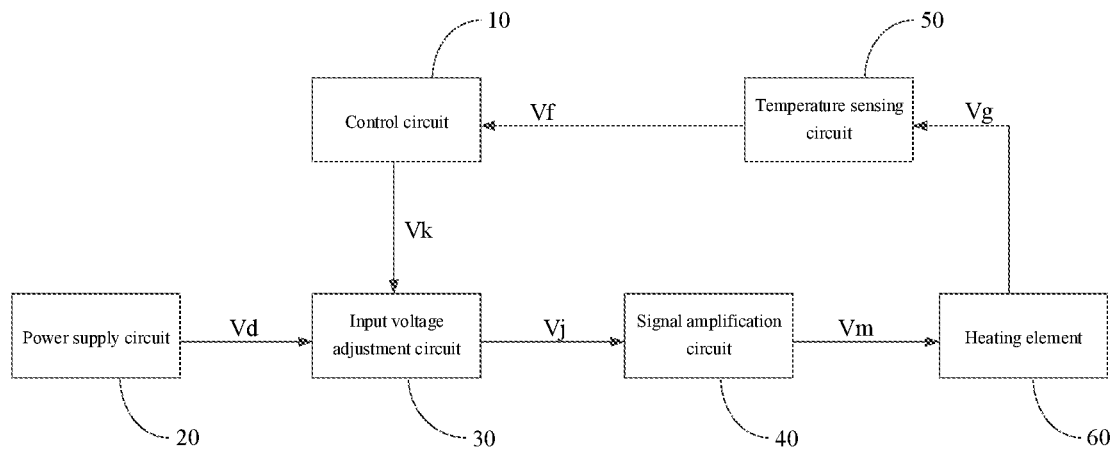
FIG. 1 is a schematic diagram of modules of a temperature control system according to an embodiment of the present disclosure.
Figure 3:
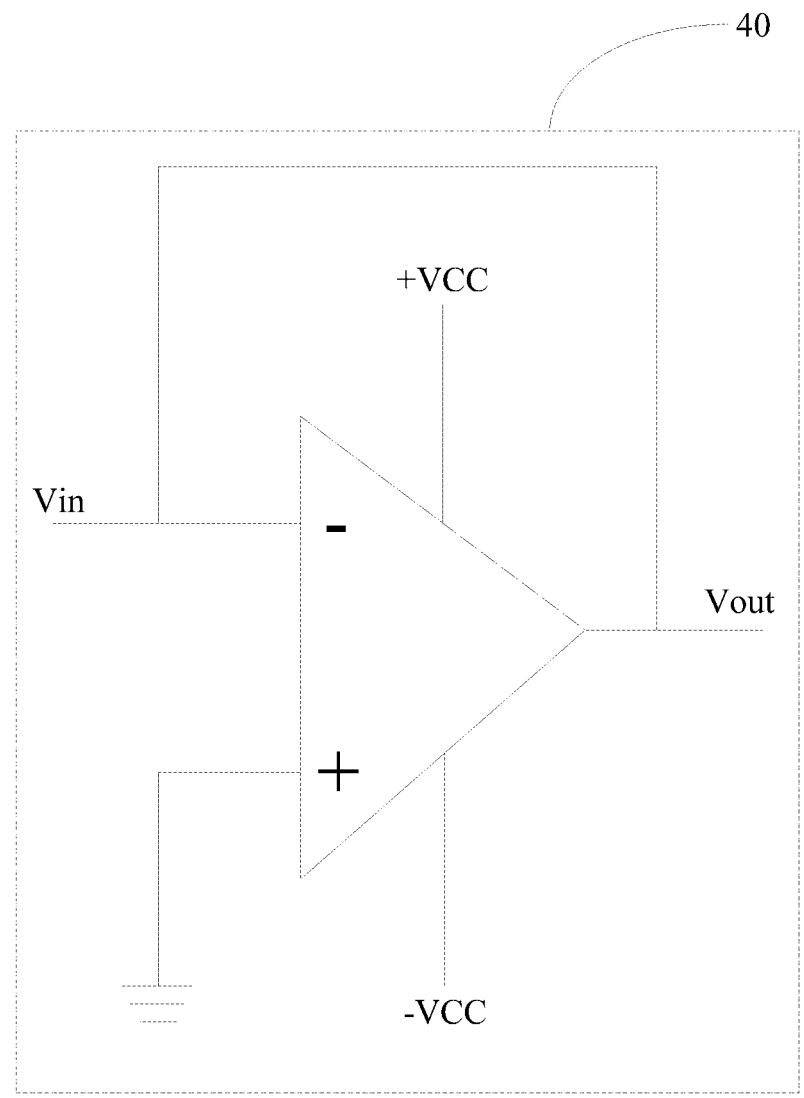
FIG. 3 is a schematic diagram of a first structure of a signal amplification circuit according to an embodiment of the present disclosure.
Figure 4:
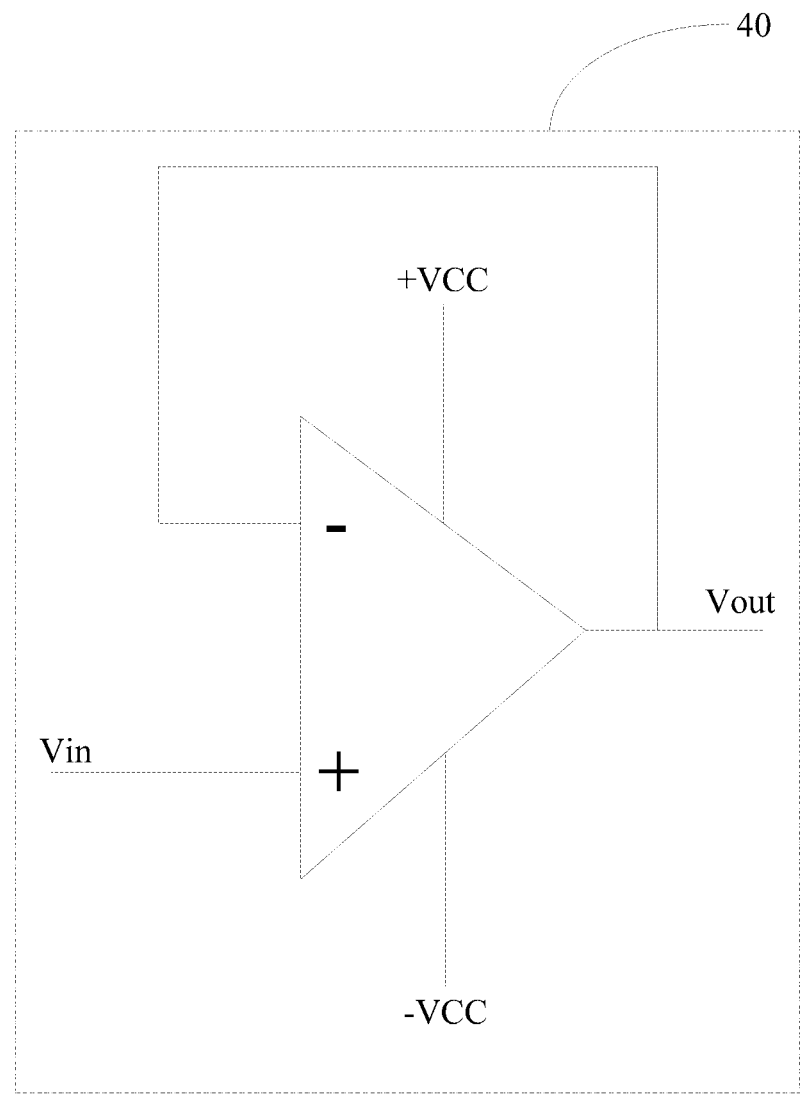
FIG. 4 is a schematic diagram of a second structure of a signal amplification circuit according to an embodiment of the present disclosure.

Referring to FIG. 1, FIG. 3, and FIG. 4, the embodiments of the present disclosure provide a temperature control system including: a control circuit 10, an input voltage adjustment circuit 30, a signal amplification circuit 40, a temperature sensing circuit 50, and a heating element 60;

wherein the input voltage adjustment circuit 30 is respectively coupled to a control signal output end of the control circuit 10, a power signal output end, and an input end Vin of the signal amplification circuit 40, and is configured to: control the signal strength of a basic electric signal Vj transmitted to the input end Vin of the signal amplification circuit 40 under the control of a control signal Vk output from the control signal output end;

an output end Vout of the signal amplification circuit 40 is coupled to the heating element 60, and is configured to output a corresponding target electric signal Vm to the heating element 60 according to the base electric signal Vj, and the heating element 60 is configured to adjust the heating temperature according to the target electric signal Vm; and the temperature sensing circuit 50 is respectively coupled to the heating element 60 and the control circuit 10, and is configured to convert a sensed sensing signal Vg into a feedback signal Vf and transmit the feedback signal Vf to the control circuit 10, and the control circuit 10 is configured to control the control signal Vk output from the control signal output end according to the received feedback signal Vf.

Illustratively, the control circuit 10 includes a microcontroller unit (MCU).

Illustratively, the power supply circuit 20 can output a 110V direct current power signal Vd from the power signal output end.

As shown in FIG. 1, FIG. 3, and FIG. 4, illustratively, the input voltage adjustment circuit 30 is connected between the power signal output end and the input end Vin of the signal amplification circuit 40, and changes the signal strength of the basic electric signal Vj transmitted to the input end Vin of the signal amplification circuit 40 by adjusting its resistance value under the control of the control signal Vk output from the control signal output end. Illustratively, the voltage adjustment circuit includes a sliding varistor.

Illustratively, the target electric signal Vm outputted from the output end Vout of the signal amplification circuit 40 can be changed following the change of the basic electric signal Vj input from the input end Vin of the signal amplification circuit 40.

Illustratively, a level value of the target electric signal Vm output from the output end Vout of the signal amplification circuit 40 is greater than that of the basic electric signal Vj input from the input end Vin of the signal amplification circuit 40.

The heating element 60 is coupled to the output end Vout of the signal amplification circuit 40, and can adjust its heating temperature according to the target electric signal Vm provided by the signal amplification circuit 40. Illustratively, when the signal intensity of the target electric signal Vm is relatively strong, the heating temperature of the heating element 60 is relatively high, and when the signal intensity of the target electric signal Vm is relatively weak, the heating temperature of the heating element 60 is relatively low.

Illustratively, the temperature sensor senses the heating temperature of the heating element 60, converts the sensed sensing signal Vg into the feedback signal Vf which may be an electrical signal, and transmits the feedback signal Vf to the control circuit 10.

Illustratively, the control circuit 10 can adjust, based on the received feedback signal Vf, the control signal Vk output from the control signal output end so as to control the input voltage adjustment circuit 30 to change the signal strength of the base electrical signal Vj transmitted to the input end Vin of the signal amplification circuit 40.

When the temperature control system operates, the following processes are implemented:
the power signal output end outputs a power signal; the input voltage adjustment circuit 30 controls the signal strength of the basic electric signal Vj transmitted to the input end Vin of the signal amplification circuit 40 under the control of the control signal Vk output from the control signal output end; the signal amplification circuit 40 outputs the corresponding target electric signal Vm to the heating element 60 according to the basic electric signal Vj; the heating element 60 adjusts the heating temperature according to the target electric signal Vm; the temperature sensing circuit 50 converts the sensed sensing signal Vg into the feedback signal Vf and transmits the feedback signal Vf to the control circuit 10; and the control circuit 10 controls the control signal Vk output from the control signal output end according to the received feedback signal Vf.

It is worthwhile to note that, in practice, the above processes may be cycled to achieve real-time adjustment of the heating element 60.

It can be seen from the above specific structure and operation processes of the temperature control system that in the temperature control system provided by the embodiments of the present disclosure, through the cooperation of the control circuit 10, the input voltage adjustment circuit 30, the signal amplification circuit 40, and the temperature sensing circuit 50, the heating temperature of the heating element 60 can be effectively controlled, thus when the temperature control system is applied to a smart window, in the case where the smart window is in a low-temperature environment, the smart window can be heated by the heating element 60 to reduce the viscosity of dye liquid crystal molecules in the smart window, so as to ensure that the dye liquid crystal molecules in the smart window can be inverted according to practical requirements, which effectively prevents the problem of an abnormal display state of the smart wisdom in the low-temperature environment. Therefore, when the temperature control system provided by the embodiments of the present disclosure is applied to a smart window, based on the principle that a circuit controls heating, the problems that the smart window cannot normally operate in a low-temperature environment and a Mura is generated in the field of rail transit are solved from the perspective of a circuit.

In addition, when the temperature control system provided by the embodiments of the present disclosure is applied to a smart window, the requirements of the smart window for liquid crystal characteristics of dye liquid crystal molecules can be reduced, thereby effectively reducing the manufacturing cost of the smart window.

Figure 2:
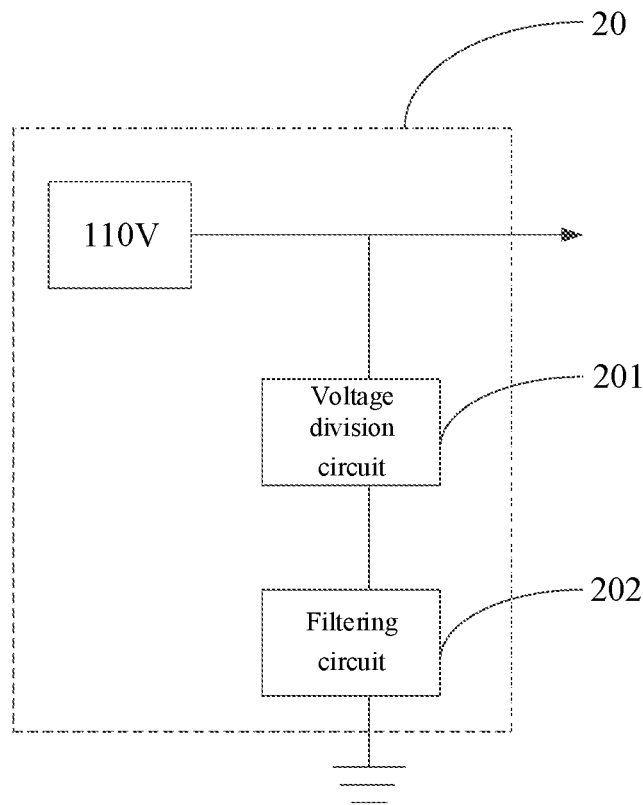
FIG. 2 is a schematic diagram of an internal structure of a power supply circuit according to an embodiment of the present disclosure.

As shown in FIG. 2, in some embodiments, the temperature control system further includes a power supply circuit 20 including the power signal output end and further including:
a voltage division circuit 201, a first end of the voltage division circuit 201 being coupled to the power signal output end; and
a filtering circuit 202, a first end of the filtering circuit 202 being coupled to a second end of the voltage division circuit 201, and a second end of the filtering circuit 202 being coupled to a first level signal input end.

Illustratively, the power supply circuit 20 can output a 110V direct current power signal Vd from the power signal output end.

Illustratively, the voltage division circuit 201 includes a voltage division resistor, and can adjust a voltage value of the power signal Vd output from the power signal output end by adjusting a resistance value of the voltage division resistor. A voltage value required by a back-end load can be obtained after the voltage adjustment of the voltage division resistor.

Illustratively, the filtering circuit 202 includes a filtering capacitor. Illustratively, the filtering capacitor includes an aluminum electrolytic capacitor. The filtering circuit 202 can filter the power signal Vd so that the back-end load can obtain a relatively pure power supply.

Illustratively, the first level signal input end inputs a negative power signal Vd; or, the first level signal input end inputs a ground signal.

In the temperature control system provided by the above embodiments, through the arrangement of the voltage division circuit 201 and the filtering circuit 202 in the power supply circuit 20, the power supply circuit 20 can provide a suitable and stable power signal Vd to the back-end load, thereby better improving the stability of the overall operation of the temperature control system.

As shown in FIG. 1, in some embodiments, the input voltage adjustment circuit 30 includes a digital potentiometer respectively coupled to the control signal output end of the control circuit 10, the power signal output end, and the input end Vin of the signal amplification circuit 40, and is configured to change a resistance value under the control of the control signal Vk output from the control signal output end so as to control the signal strength of the basic electric signal Vj transmitted to the input end Vin of the signal amplification circuit 40.

Illustratively, the digital potentiometer is connected between the power signal output end and the input end Vin of the signal amplification circuit 40, and changes the signal strength of the basic electric signal Vj transmitted to the input end Vin of the signal amplification circuit 40 by adjusting its resistance value under the control of the control signal Vk output from the control signal output end.

The digital potentiometer is controlled by digital input to produce one analog output. The digital potentiometer adopts a numerical control method to adjust a resistance value, which has obvious advantages of flexible use, high adjustment precision, no contact, low noise, no pollution, anti-vibration, anti-interference, small size, long life, etc.

In the temperature control system provided by the above embodiments, through the arrangement of the digital potentiometer in the input voltage adjustment circuit 30, the signal strength of the basic electric signal Vj transmitted to the input end Vin of the signal amplification circuit 40 can be more conveniently and accurately controlled.

As shown in FIG. 3, in some embodiments, the signal amplification circuit 40 includes:

a first operational amplifier, wherein an inverting input end of the first operational amplifier is respectively coupled to an output end of the operational amplifier and the input voltage adjustment circuit 30, and is configured to receive the basic electric signal Vj; a non-inverting input of the first operational amplifier is coupled to the first level signal input end; and the output end of the first operational amplifier is coupled to the heating element 60.

Illustratively, the first operational amplifier has two power ends, e.g.: +VCC and −VCC, and further has two input ends and one output end, wherein "+" is a non-inverting input end and "−" is an inverting input end.

Illustratively, the first level signal input end inputs a negative power signal; or, the first level signal input end inputs a ground signal.

Through the above arrangement that the inverting input end of the first operational amplifier is respectively coupled to the output end of the operational amplifier and the input voltage adjustment circuit 30, and the non-inverting input end of the first operational amplifier is coupled to the first level signal input end, the first operational amplifier can amplify the basic electric signal Vj received by its input end and transmit the amplified basic electric signal Vj to the heating element 60, thereby better controlling the heating temperature of the heating element 60.

As shown in FIG. 4, in some embodiments, the signal amplification circuit 40 includes:

a second operational amplifier, wherein an inverting input end of the second operational amplifier is coupled to an output end of the operational amplifier, a non-inverting input end of the second operational amplifier is coupled to the input voltage adjustment circuit 30 and is configured to receive the basic electric signal Vj; and the output end of the second operational amplifier is coupled to the heating element 60.

Illustratively, the second operational amplifier has two power ends, e.g.: +VCC and −VCC, and further has two input ends and one output end, wherein "+" is a non-inverting input end and "−" is an inverting input end.

Through the above arrangement that the inverting input end of the second operational amplifier is coupled to the output end of the operational amplifier, and the non-inverting input end of the second operational amplifier is coupled to the input voltage adjustment circuit 30, the second operational amplifier can amplify the basic electric signal Vj received by its input end and transmit the amplified basic electric signal Vj to the heating element 60, thereby better controlling the heating temperature of the heating element 60.

In some embodiments, the temperature sensing circuit 50 includes a thermocouple sensor, wherein a working end of the thermocouple sensor is coupled to the heating element 60, a feedback end of the thermocouple sensor is coupled to the control circuit 10, and a reference end of the thermocouple is configured to receive the outside temperature.

The thermocouple sensor is configured to convert the sensed sensing signal Vg into the feedback signal Vf and transmit the feedback signal Vf to the control circuit 10; illustratively, the sensing signal Vg is a temperature signal, and the feedback signal Vf is an electrical signal.

The thermocouple sensor is a temperature sensing element that can directly measure the temperature and convert a temperature signal into a thermoelectromotive force signal.

The basic principle of temperature measurement of the thermocouple sensor is that two kinds of homogeneous conductors with different compositions constitute a closed loop. When a temperature gradient is formed between two ends, a current will flow through the loop, and an electromotive force (thermoelectromotive force) will be formed between the two ends, which is the so-called Seebeck effect. The two kinds of homogeneous conductors with different compositions are hot electrodes, wherein one end with a higher temperature is a working end, and one end with a lower temperature is a free end which is usually at a certain constant temperature. A thermocouple reference table is made according to a function relationship between the thermoelectromotive force and the temperature; the reference table is obtained under a condition that the temperature of the free end is 0° C., and different thermocouples have different reference tables.

The two kinds of conductors (known as thermocouple wires or thermodes) with different compositions are connected at both ends to form a loop. When the temperatures at the two junctions are different, an electromotive force is generated in the loop. This phenomenon is called thermoelectric effect, and this electromotive force is called thermoelectromotive force. The thermocouple sensor uses this principle for temperature measurement, one end directly configured to measure the temperature of a medium is called a working end (also called a measurement end), the other end is called a cold end (also called a compensation end); the cold end may be connected to a displaying meter or match meter, and the display meter indicates the thermoelectromotive force generated by the thermocouple.

In the temperature control system provided by the above embodiments, through the arrangement of the thermocouple sensor in the temperature sensing circuit 50, the control circuit 10, the digital potentiometer, and the thermocouple sensor can constitute a feedback adjustment circuit, that is, the target electric signal Vm transmitted to the heating element 60 is adjusted according to a current heating temperature of the heating element 60, so the heating temperature of the heating element 60 is constantly maintained within a set range at all times.

In some embodiments, the temperature sensing circuit 50 includes a temperature sensor.

The temperature sensor can convert the sensed sensing signal Vg into the feedback signal Vf and transmit the feedback signal Vf to the control circuit 10; illustratively, the sensing signal Vg is a temperature signal, and the feedback signal Vf is an electrical signal.

In the temperature control system provided by the above embodiments, through the arrangement of the temperature sensor in the temperature sensing circuit 50, the control circuit 10, the digital potentiometer, and the temperature sensor can constitute a feedback adjustment circuit, that is, the electric signal transmitted to the heating element 60 is adjusted according to a current heating temperature of the heating element 60, so the heating temperature of the heating element 60 is constantly maintained within a set range at all times.

In some embodiments, the heating element 60 includes a resistance wire.

A resistance wire is an electrical element that can convert electrical energy into internal energy, electrical signals transmitted to the resistance wire are different, and the heating temperatures of the resistance wire are different.

A size and a shape of the resistance wire can both be set according to actual requirements, through the above arrangement that the heating element 60 includes the resistance wire, a function of heating a smart window by the heating element 60 can be better achieve.

Figure 5:
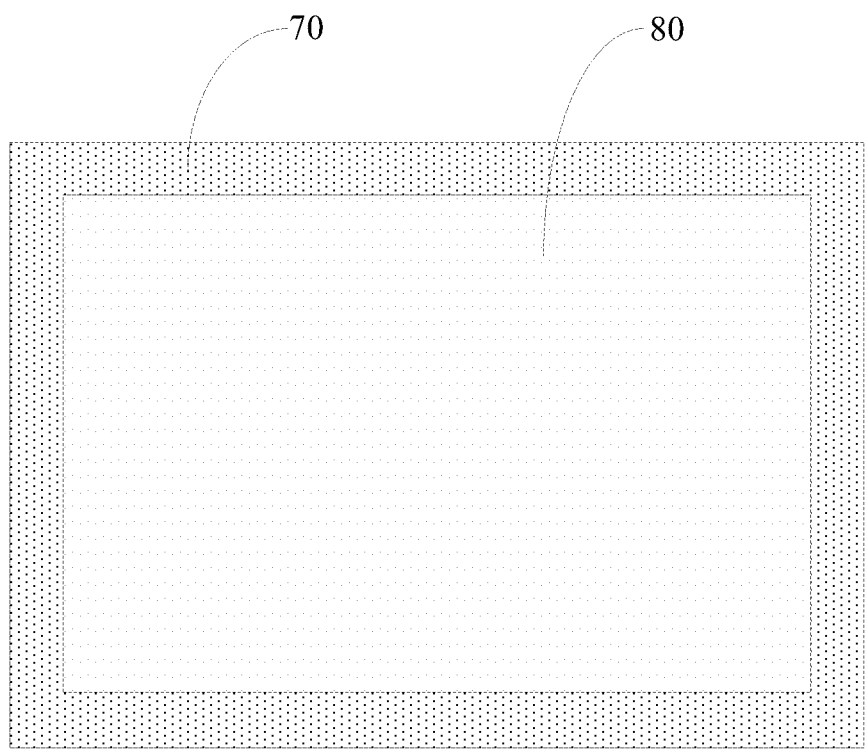
FIG. 5 is a schematic diagram of a first structure of a liquid crystal apparatus according to an embodiment of the present disclosure.

As shown in FIG. 5, the embodiments of the present disclosure further provide a liquid crystal apparatus including the temperature control system provided by the above embodiments, wherein the liquid crystal apparatus further includes a liquid crystal panel, the temperature control system is arranged in an opaque region of the liquid crystal panel, and the temperature control system can control the temperature of the liquid crystal panel by controlling the heating temperature of the heating element 60.

Illustratively, at least a part of the temperature control system is embedded in the liquid crystal panel.

Illustratively, the liquid crystal panel includes a liquid crystal filling region 80 and the opaque region surrounding the liquid crystal filling region 80, wherein the liquid crystal filling region is a region configured to adjust whether to transmit light, the opaque region includes an encapsulation area 70; and the heating element 60 is arranged in the opaque region.

The liquid crystal apparatus can adjust its transmittance by controlling the inversion of dye liquid crystal.

In the temperature control system provided by the above embodiments, through the cooperation of the control circuit 10, the power supply circuit 20, the input voltage adjustment circuit 30, the signal amplification circuit 40, and the temperature sensing circuit 50, the heating temperature of the heating element 60 can be effectively controlled.

The liquid crystal apparatus provided by the embodiments of the present disclosure includes the temperature control system, so that in the case where the liquid crystal apparatus is in a low-temperature environment, the liquid apparatus can be heated by the heating element 60 to reduce the viscosity of dye liquid crystal molecules in the liquid crystal apparatus, thereby ensuring that the dye liquid crystal molecules in the liquid crystal apparatus can be inverted according to actual requirements and effectively preventing the problem of an abnormal display state of the liquid crystal apparatus in the low-temperature environment. Therefore, the liquid crystal apparatus provided by the embodiments of the present disclosure solves, based on the principle that a circuit controls heating, the problems that the liquid crystal apparatus cannot operate normally in a low-temperature environment and a Mura is generated in the field of rail transit from the perspective of a circuit.

In addition, the liquid crystal apparatus provided by the embodiments of the present disclosure reduces requirements for liquid crystal characteristics of the dye liquid crystal molecules, thereby effectively reducing the manufacturing cost of the liquid crystal apparatus.

As shown in FIG. 5, in some embodiments, the liquid crystal panel includes a first substrate and a second substrate which are arranged opposite to each other, and dye liquid crystal molecules arranged between the first substrate and the second substrate; the first substrate and the second substrate are bonded together by a frame sealing adhesive in the encapsulation region 70 of the liquid crystal panel; and the temperature control system is arranged in the encapsulation region 70.

Illustratively, the first substrate and the second substrate are both glass substrates.

Illustratively, the dye liquid crystal molecules are located between an interlayer formed by the first substrate and the second substrate.

Illustratively, when the first substrate and the second substrate are adhered and encapsulated, edges of the substrates need to be adhered by an adhesive, and this region is the encapsulation region 70 which may be black and opaque.

In the liquid crystal apparatus provided by the above embodiments, through the arrangement of the temperature control system in the encapsulation region 70, not only the temperature control of the temperature control system to the liquid crystal apparatus is ensured, but also the blocking of the temperature control system to the liquid crystal filling region 80 of the liquid crystal apparatus is prevented.

Figure 6:
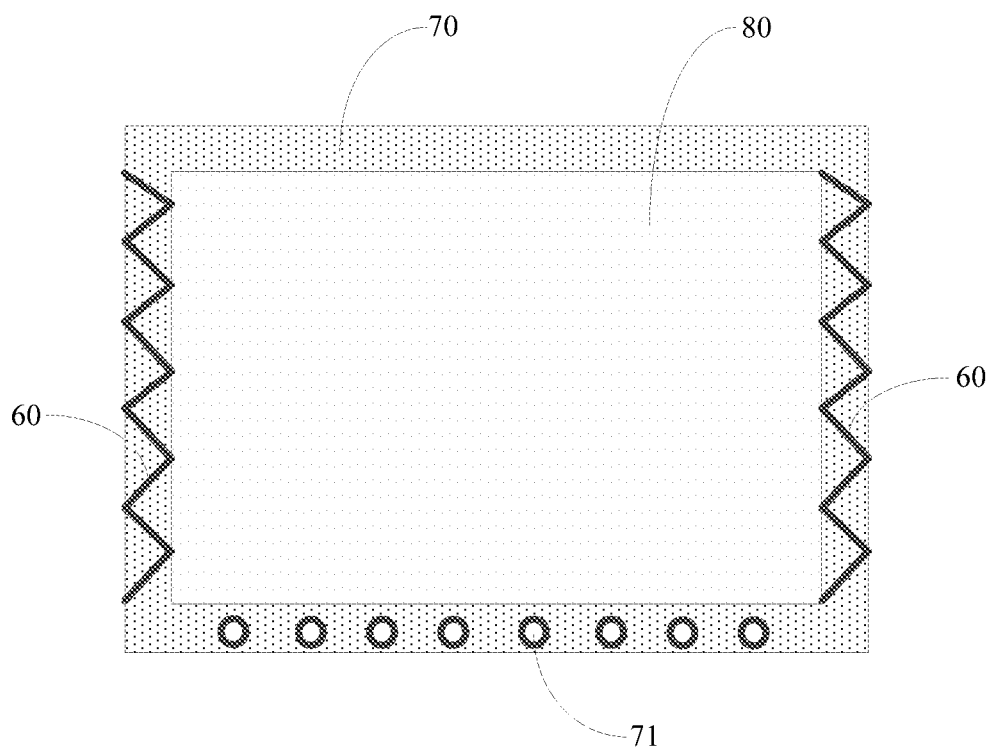
FIG. 6 is a schematic diagram of a second structure of a liquid crystal apparatus according to an embodiment of the present disclosure

As shown in FIG. 6, in some embodiments, the heating elements 60 in the temperature control system are located on two opposite sides of the liquid crystal panel.

Illustratively, the heating elements 60 are respectively located on two opposite sides of the liquid crystal filling region 80.

Illustratively, the heating elements 60 are located in the encapsulation region 70 and surround the liquid crystal filling region 80.

Illustratively, the heating element 60 is a resistance wire which is arranged in the encapsulation region 70.

Illustratively, the resistance wires are located on the two opposite sides of the liquid crystal filling region 80.

Illustratively, the resistance wires surround the liquid crystal filling region 80.

In the liquid crystal apparatus provided by the above embodiments, through the arrangement of the heating elements 60 at the periphery of the liquid crystal panel, not only the temperature control of the temperature control system to the liquid crystal apparatus is ensured, but also the blocking of the temperature control system to the liquid crystal filling region 80 of the liquid crystal apparatus is prevented.

As shown in FIG. 6, in some embodiments, a plurality of heat dissipation holes 71 are formed in the encapsulation region 70 of the liquid crystal panel.

Illustratively, the heating elements 60 are arranged on opposite first and second sides of the liquid crystal panel, and the plurality of heat dissipation holes 71 are formed on a third side of the liquid crystal panel, and in practice, the third side is a lower side of the liquid crystal apparatus.

Illustratively, the plurality of heat dissipation holes 71 are uniformly distributed on one side of the liquid crystal panel.

As shown in FIG. 6, in some embodiments, the plurality of heat dissipation holes 71 are located at a bottom of the liquid crystal apparatus.

When the internal temperature of the liquid crystal panel is too high, heat can be conducted out via the heat dissipation holes 71. Moreover, because hot gas rises, and the heat dissipation holes 71 are located at the bottom, the internal temperature of the liquid crystal panel may be effectively maintained to prevent energy loss.

As shown in FIG. 6, in some embodiments, the liquid crystal apparatus further includes a heat conduction member coupled with the plurality of heat dissipation holes 71 and configured to conduct heat discharged from the plurality of heat dissipation holes 71 to an external heating apparatus.

Illustratively, one end of the heat conduction member is coupled to the heat dissipation holes 71, and the other end of the heat conduction member is coupled to the external heating apparatus.

Illustratively, the heat discharged from the plurality of heat dissipation holes 71 may also be conducted to a shell of a car body adjacent a passenger.

The heat dissipation holes 71 at a lower part of the dye liquid crystal apparatus can be used as a supplementary heating apparatus for rail transit, thereby effectively reusing resources.

In some embodiments, the liquid crystal apparatus includes liquid crystal glass.

Through the arrangement of the liquid crystal glass in the liquid crystal apparatus, the liquid crystal apparatus has higher transmittance.

The embodiments of the present disclosure further provide a window including: the liquid crystal apparatus provide by the above embodiments.

Illustratively, the window is applied to a rail transit system.

Illustratively, the window is applied to a G-series high-speed train or bullet train.

The liquid crystal apparatus provided by the above embodiments includes the temperature control system, so that in the case where the liquid crystal apparatus is in a low-temperature environment, the liquid apparatus can be heated by the heating element 60 to reduce the viscosity of the dye liquid crystal molecules in the liquid crystal apparatus, thereby ensuring that the dye liquid crystal molecules in the liquid crystal apparatus can be inverted according to actual requirements and effectively preventing the problem of an abnormal display state of the liquid crystal apparatus. Therefore, the liquid crystal apparatus provided by the above embodiments solves, based on the principle that a circuit controls heating, the problems that the liquid crystal apparatus cannot operate normally in a low-temperature environment and a Mura is generated in the field of rail transit from the perspective of a circuit. In addition, the liquid crystal apparatus provided by the above embodiments reduces requirements for liquid crystal characteristics of the dye liquid crystal molecules, thereby effectively reducing the manufacturing cost of the liquid crystal apparatus.

The window provided by the embodiments of the present disclosure also has the above beneficial effects when including the above liquid crystal apparatus, which will not be repeated in detail here.

The embodiments of the present disclosure further provide a driving method of a temperature control system including: a control circuit 10, an input voltage adjustment circuit 30, a signal amplification circuit 40, a temperature sensing circuit 50, and a heating element 60; wherein the input voltage adjustment circuit 30 is respectively coupled to a control signal output end of the control circuit 10, a power signal output end, and an input end Vin of the signal amplification circuit 40; an output end Vout of the signal amplification circuit 40 is coupled to the heating element 60; the temperature sensing circuit 50 is respectively coupled to the heating element 60 and the control circuit 10; and the driving method includes the following steps:

the power signal output end outputs a power signal;

the input voltage adjustment circuit 30 controls the signal strength of a basic electric signal Vj transmitted to the input end Vin of the signal amplification circuit 40 under the control of a control signal Vk output from the control signal output end;

the signal amplification circuit 40 outputs a corresponding target electric signal Vm to the heating element 60 according to the basic electric signal Vj;

the heating element 60 adjusts the heating temperature according to the target electric signal Vm;

the temperature sensing circuit 50 converts a sensed sensing signal Vg into a feedback signal Vf and transmits the feedback signal Vf to the control circuit 10; and the control circuit 10 controls the control signal Vk output from the control signal output end according to the received feedback signal Vf.

Illustratively, the control circuit 10 includes a microcontroller unit (MCU).

Illustratively, the power supply circuit 20 can output a 110V direct current power signal Vd from the power signal output end.

As shown in FIG. 1, FIG. 3, and FIG. 4, illustratively, the input voltage adjustment circuit 30 is connected between the power signal output end and the input end Vin of the signal amplification circuit 40, and changes the signal strength of the basic electric signal Vj transmitted to the input end Vin of the signal amplification circuit 40 by adjusting its resistance value under the control of the control signal Vk output from the control signal output end. Illustratively, the voltage adjustment circuit includes a sliding varistor.

Illustratively, the target electric signal Vm outputted from the output end Vout of the signal amplification circuit 40 can be changed following the change of the basic electric signal Vj input from the input end Vin of the signal amplification circuit 40.

Illustratively, a level value of the target electric signal Vm output from the output end Vout of the signal amplification circuit 40 is greater than that of the basic electric signal Vj input from the input end Vin of the signal amplification circuit 40.

The heating element 60 is coupled to the output end Vout of the signal amplification circuit 40, and can adjust its heating temperature according to the target electric signal Vm provided by the signal amplification circuit 40. Illustratively, when the signal intensity of the target electric signal Vm is relatively strong, the heating temperature of the heating element 60 is relatively high, and when the signal intensity of the target electric signal Vm is relatively weak, the heating temperature of the heating element 60 is relatively low.

Illustratively, the temperature sensor senses the heating temperature of the heating element 60, converts the sensed sensing signal Vg into the feedback signal Vf which may be an electrical signal, and transmits the feedback signal Vf to the control circuit 10.

Illustratively, the control circuit 10 can adjust, based on the received feedback signal Vf, the control signal Vk output from the control signal output end so as to control the input voltage adjustment circuit 30 to change the signal strength of the base electrical signal Vj transmitted to the input end Vin of the signal amplification circuit 40.

It is worthwhile to note that, in practice, the above processes may be cycled to achieve real-time adjustment of the heating element 60.

In the driving method of the temperature control system provided by the embodiments of the present disclosure, through the cooperation of the control circuit 10, the input voltage adjustment circuit 30, the signal amplification circuit 40, and the temperature sensing circuit 50, the heating temperature of the heating element 60 may be effectively controlled, so when the temperature control system is applied to a smart window, in the case where the smart window is in a low-temperature environment, the smart window can be heated by the heating element 60 to reduce the viscosity of dye liquid crystal molecules in the smart window, thereby ensuring that the dye liquid crystal molecules in the smart window can be inverted according to actual requirements and effectively preventing the problem of an abnormal display state of the smart window in the low-temperature environment. Therefore, when the temperature control system driven by the driving method provided by the embodiments of the present disclosure is applied to a smart window, based on the principle that a circuit controls heating, the problems that the smart window cannot normally operate in a low-temperature environment and a Mura is generated in the field of rail transmit are solved from the perspective of a circuit.

In addition, when the temperature control system driven by the driving method provided by the embodiments of the present disclosure is applied to a smart window, the requirements of the smart window for liquid crystal characteristics of dye liquid crystal molecules can be reduced, thereby effectively reducing the manufacturing cost of the smart window.

It should be noted that the various embodiments described here are described in a progressive manner with reference to the same or similar parts throughout the various embodiments, with each embodiment focusing on differences from the other embodiments. In particular, the method embodiments are described more simply because they are substantially similar to the product embodiments, with reference to the description of the product embodiments.

Unless defined otherwise, the technical or scientific terms used in the present disclosure shall have the ordinary meaning as understood by those of ordinary skill in the art to which the present disclosure belongs. As used in the present disclosure, the terms "first", "second", and the like do not denote any order, quantity, or importance, but rather are used to distinguish different components. The word "include", "comprise", or the like means that the element or component preceded by the word is inclusive of the element or component listed after the word and its equivalents, and does not exclude other elements or components. The word "connect", "couple", or the like is not limited to physical or mechanical connections, but may include electrical connections, whether direct or indirect. "Upper", "lower", "left", "right", etc. are merely used to denote relative positional relationships, which may be changed accordingly when an absolute position of a described object is changed.

It can be understood that when an element such as a layer, film, region, or substrate is referred to as being located "above" or "below" another element, the element can be "directly" located "above" or "below" another element or an intervening element may be exist.

In the description of the above implementations, specific features, structures, materials, or characteristics may be combined in a suitable manner in any one or more embodiments or examples.

The above embodiments are merely specific implementations of the present disclosure, but the scope of protection of the present disclosure is not limited thereto, and any modification or substitution apparent to those skilled in the art without departing from the technical scope of the present disclosure shall covered by the scope of protection of the present disclosure. Accordingly, the scope of protection of the present disclosure is as set forth in the claims.

What is claimed is:

1. A liquid crystal apparatus, comprising a temperature control system, wherein the temperature control system comprises: a control circuit, an input voltage adjustment circuit, a signal amplification circuit, a temperature sensing circuit, and a heating element;

wherein the input voltage adjustment circuit is respectively coupled to a control signal output end of the control circuit, a power signal output end, and an input end of the signal amplification circuit, and is configured to: control the signal strength of a basic electric signal transmitted to the input end of the signal amplification circuit under the control of a control signal output from the control signal output end;

an output end of the signal amplification circuit is coupled to the heating element, and is configured to output a corresponding target electrical signal to the heating element according to the basic electrical signal, and the heating element is configured to adjust the heating temperature according to the target electrical signal; and the temperature sensing circuit is respectively coupled to the heating element and the control circuit, and is configured to convert a sensed sensing signal into a feedback signal and transmit the feedback signal to the control circuit, and the control circuit is configured to control the control signal output from the control signal output end according to the received feedback signal wherein the liquid crystal apparatus further comprises a liquid crystal panel, wherein the temperature control system is arranged in an opaque region of the liquid crystal panel, and the temperature control system is capable of controlling the temperature of the liquid crystal panel by controlling the heating temperature of the heating element.

2. The liquid crystal apparatus according to claim 1, wherein the liquid crystal panel comprises a first substrate and a second substrate which are arranged opposite to each other, and dye liquid crystal molecules arranged between the first substrate and the second substrate, the first substrate and the second substrate are bonded together by a frame sealing adhesive in an encapsulation region of the liquid crystal panel; and the temperature control system is arranged in the encapsulation region.

3. The liquid crystal apparatus according to claim 2, wherein the heating elements in the temperature control system are respectively located on two opposite sides of the liquid crystal panel.

4. The liquid crystal apparatus according to claim 2, wherein a plurality of heat dissipation holes are formed in the encapsulation region of the liquid crystal panel.

5. The liquid crystal apparatus according to claim 4, wherein the plurality of heat dissipation holes are located at a bottom of the liquid crystal apparatus.

6. The liquid crystal apparatus according to claim 4, wherein the liquid crystal apparatus further comprises a heat conduction member coupled with the plurality of heat dissipation holes and configured to conduct heat discharged from the plurality of heat dissipation holes to an external heating apparatus.

7. The liquid crystal apparatus according to claim 1, wherein the liquid crystal apparatus comprises liquid crystal glass.

8. The liquid crystal apparatus according to claim 1, wherein the temperature control system further comprises a power supply circuit comprising the power signal output end, and the power supply circuit further comprises:

a voltage division circuit, a first end of the voltage division circuit being coupled to the power signal output end; and a filtering circuit, a first end of the filtering circuit being coupled to a second end of the voltage division circuit, and a second end of the filtering circuit being coupled to a first level signal input end.

9. The liquid crystal apparatus according to claim 1, wherein the input voltage adjustment circuit comprises a digital potentiometer respectively coupled to the control signal output end of the control circuit, the power signal output end, and the input end of the signal amplification circuit, and the digital potentiometer is configured to change a resistance value under the control of the control signal output from the control signal output end to control the signal strength of the basic electrical signal transmitted to the input end of the signal amplification circuit.

10. The liquid crystal apparatus according to claim 1, wherein the signal amplification circuit comprises:
a first operational amplifier, an inverting input end of the first operational amplifier being respectively coupled to an output end of the operational amplifier and the input voltage adjustment circuit, and being configured to receive the basic electric signal; a non-inverting input end of the first operational amplifier being coupled to a first level signal input end; and
the output of the first operational amplifier being coupled to the heating element.

11. The liquid crystal apparatus according to claim 1, wherein the signal amplification circuit comprises:
a second operational amplifier, an inverting input end of the second operational amplifier being coupled to an output end of the operational amplifier, a non-inverting input end of the second operational amplifier being coupled to the input voltage adjustment circuit, and being configured to receive the basic electric signal; and the output end of the second operational amplifier being coupled to the heating element.

12. The liquid crystal apparatus according to claim 1, wherein the temperature sensing circuit comprises a thermocouple sensor, a working end of the thermocouple sensor is coupled to the heating element, a feedback end of the thermocouple sensor is coupled to the control circuit, and a reference end of the thermocouple sensor is configured to receive the outside temperature.

13. The liquid crystal apparatus according to claim 1, wherein the heating element comprises a resistance wire.

14. A driving method of a liquid crystal apparatus, wherein the liquid crystal apparatus comprises a temperature control system comprising: a control circuit, an input voltage adjustment circuit, a signal amplification circuit, a temperature sensing circuit, and a heating element;
wherein the input voltage adjustment circuit is configured to: control the signal strength of a basic electric signal transmitted to the input end of the signal amplification circuit under the control of a control signal output from the control signal output end;
an output end of the signal amplification circuit is configured to output a corresponding target electrical signal to the heating element according to the basic electrical signal, and the heating element is configured to adjust the heating temperature according to the target electrical signal; and
the temperature sensing circuit is configured to convert a sensed sensing signal into a feedback signal and transmit the feedback signal to the control circuit, and the control circuit is configured to control the control signal output from the control signal output end according to the received feedback signal
wherein the liquid crystal apparatus further comprises a liquid crystal panel, wherein the temperature control system is arranged in an opaque region of the liquid crystal panel, and the temperature control system is capable of controlling the temperature of the liquid crystal panel by controlling the heating temperature of the heating element;
the input voltage adjustment circuit is respectively coupled to a control signal output end of the control circuit, a power signal output end, and an input end of the signal amplification circuit;
an output end of the signal amplification circuit is coupled to the heating element; the temperature sensing circuit is respectively coupled to the heating element and the control circuit; and the driving method comprises the following steps:
outputting, by the power signal output end, a power signal;
controlling, by the input voltage adjustment circuit, the signal strength of a basic electrical signal transmitted to the input end of the signal amplification circuit under the control of a control signal output from the control signal output end;
outputting, by the signal amplification circuit, a corresponding target electrical signal to the heating element according to the basic electrical signal;
adjusting, by the heating element, the heating temperature according to the target electric signal;
converting, by the temperature sensing circuit, a sensed sensing signal into a feedback signal, and transmitting the feedback signal to the control circuit; and
controlling, by the control circuit, the control signal output from the control signal output end according to the received feedback signal.

* * * * *